United States Patent
Lin et al.

(10) Patent No.: US 7,984,397 B2
(45) Date of Patent: Jul. 19, 2011

(54) POWER NETWORK STACKED VIA REMOVAL FOR CONGESTION REDUCTION

(75) Inventors: Yan Lin, Sunnyvale, CA (US); Yi-Min Jiang, San Jose, CA (US); Lin Yuan, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 245 days.

(21) Appl. No.: 12/359,091

(22) Filed: Jan. 23, 2009

(65) Prior Publication Data
US 2010/0190277 A1    Jul. 29, 2010

(51) Int. Cl.
*G06F 17/50* (2006.01)
(52) U.S. Cl. ............................................. 716/100
(58) Field of Classification Search .............. 716/1, 100
See application file for complete search history.

(56) References Cited

U.S. PATENT DOCUMENTS

| | | | |
|---|---|---|---|
| 2003/0014201 A1 | 1/2003 | Schultz | |
| 2004/0073878 A1 | 4/2004 | Hasegawa et al. | |
| 2006/0225005 A1* | 10/2006 | Correale et al. | 716/2 |
| 2006/0226530 A1* | 10/2006 | Dinter et al. | 257/691 |
| 2007/0246827 A1* | 10/2007 | Owa | 257/734 |
| 2008/0127020 A1 | 5/2008 | Rittman | |
| 2009/0289348 A1* | 11/2009 | Tang et al. | 257/697 |

OTHER PUBLICATIONS

Liu Peng et al. "Physical design method of MPSoC", Journal of Zhejiang University SCIENCE A, 2007, 8(4), pp. 631-637.
Pillage et al. *Electronic Circuit and System Simulation Method.* "Chapter 3.6, Sensitivity Analysis", New York: McGraw-Hill, 1995, pp. 67-74.

* cited by examiner

*Primary Examiner* — Jack Chiang
*Assistant Examiner* — Suchin Parihar
(74) *Attorney, Agent, or Firm* — Bever, Hoffman & Harms, LLP; Jeanette S. Harms

(57) ABSTRACT

A method of automatically reducing stacked vias while minimizing voltage drop in a power network of an integrated circuit (IC) is provided. In this method, any feasible (i.e. other than connectivity-necessary and uncongested stacked vias) stacked vias of the power network can be virtually removed. If a target voltage drop of the power network is exceeded, then a measurement of the severity of at least a maximum voltage drop on the IC can be updated. After this updating, a set of voltage drop improvement stacked vias can be virtually returned to the power network. The steps of determining whether the target voltage drop is exceeded, updating the severity of the voltage drop at one or more hot spots, and virtually returning the set of additional stacked vias can be repeated until the target voltage drop is not exceeded.

12 Claims, 8 Drawing Sheets

POWER NETWORK STACKED VIA REMOVAL FOR CONGESTION REDUCTION

BACKGROUND OF THE INVENTION

1. Field of the Invention

The present invention relates to the power network of an integrated circuit (IC) and in particular to reducing congestion on the IC by removing power network stacked vias while ensuring that a target voltage drop is not exceeded and maintaining the connectivity of the original power network.

2. Related Art

As the power supply voltage level in industrial IC designs continues to scale down due to the continuing drive for low-power electronics, the noise introduced by voltage drop in the power (or ground) network becomes increasingly important. As a result, a dense power network may be required to minimize the voltage drop. This dense power network can include a large number of stacked vias created from the top-level power network all the way down to the standard cell rails. As used herein, a stacked via is defined as a plurality of vias connecting two metal lines in non-adjacent metal layers and having no intermediate, connecting metal lines. For example, FIG. 1 illustrates an exemplary stacked via 100 including three vias 101, 102, and 103. Stacked via 100 connects metal lines 104 and 105 (which are formed in different metal layers) and have no intermediate, connecting metal lines (i.e. the interface between vias 101 and 102 has no connection to a metal line; similarly, the interface between vias 102 and 103 has no connection to a metal line).

Unfortunately, the use of stacked vias may cause congestion on an IC. For example, FIG. 2 illustrates an exemplary top view of one via layer of a power network 200 including a plurality of vias 201 (three labeled for illustration purposes), all of which represent the locations of stacked vias. In an actual power network, numerous stacked vias could be included, which along with components of the IC design (not shown for simplicity in relation to the via layer), could easily result in congestion. Conventional approaches to reducing this congestion have distinct disadvantages.

For example, increasing the die size of the IC can reduce congestion, but incurs higher cost and longer turn-around time. Uniformly removing stacked vias every other N rows/columns (where N is a predetermined integer greater than 1) can also reduce congestion, but may incur higher voltage drop and loss of power network connectivity. Replacing normal vias with smaller vias having fewer cuts can also reduce congestion, but may incur higher voltage drop and higher electro-migration. (Note that a via includes one or more cuts (i.e. holes) therein that are filled with metal to connect the two metal lines. As the metal lines get wider, typically more cuts are provided in the via, thereby essentially forming a via array from the one "via". Decreasing the number of cuts undesirably increases the resistance of such a via.) Manually removing stacked vias in congestion hot spots can also reduce congestion, but may incur higher voltage drop, the loss of power network connectivity, and longer turn-around time.

Therefore, a need arises for a technique of reducing congestion on an IC while meeting the voltage drop requirement, guaranteeing no loss of power network connectivity, and minimizing turn-around time.

SUMMARY OF THE INVENTION

A method of automatically reducing stacked vias in a power network of an integrated circuit (IC) is provided. Advantageously, this method also maintains the power network connectivity and minimizes voltage drop in the power network. In this method, an IC design, a power network of the IC design, a target voltage drop of the power network, and congestion information based on the IC design and the power network are determined.

Congestion can be determined by finding a number of tracks (each track indicating a predetermined area suitable for placing an IC element or a portion thereof) occupied in a particular orientation (i.e. either horizontal or vertical) for each grid in a congestion map. The number of tracks allowed to be occupied in a grid (in each orientation) depends on the technology node as well as the lithography technology available. If the number of tracks of a grid occupied by the elements of the design and the stacked vias exceed a predetermined threshold, then that grid can be characterized as being congested.

At this point, the stacked vias, the connectivity-necessary stacked vias, the uncongested stacked vias, and the feasible stacked vias in the power network can be identified. The connectivity-necessary stacked vias refer to any stacked vias necessary to implement the IC design and maintain the connectivity of the power network.

In one embodiment, identifying the connectivity-necessary stacked vias can include modeling the power network as a graph, wherein an edge in the graph can represent a wire segment, a via, or a stacked via. A node in the graph represents the intersection between two or multiple edges. A source node in the graph represents a power pad or pin which provides power. A super source node in the graph is a node connecting all the source nodes. A sink node in the graph represents a current sink, e.g. the power pin of one standard cell or macro block which consumes power. The congestion cost of each wire segment, via, or stacked via can be determined by analyzing the total congestion overflow associated with itself based on a congestion map (which includes both the power network and components of the IC design). Each edge is then associated with a congestion weight based on the corresponding wire, via, or stacked via.

A minimum set of edges can be identified in the graph such that there is at least one path from the super source node to each sink node. Notably, at the same time, the total congestion weights of the minimum set of edges can be minimized. This set of edges is herein referenced as essential edges. The stacked vias corresponding to any edge in the resulting minimum set of edges can be identified as connectivity-necessary stacked vias.

In one embodiment to identify essential edges, a Minimum Spanning Tree (MST) can be extracted from the graph to connect all nodes in the graph. The paths only composed of MST edges are then traced back from each sink node back to the super source node. The edges in these paths can be identified as essential edges. In another embodiment to identify essential edges, the shortest path from the super source node to each sink node can be found, wherein the distance of each edge is the congestion weight. In yet another embodiment to identify essential edges, the multiple-sink graph-based Minimum Steiner Tree routing from the super source node to each sink node can be explored.

The uncongested stacked vias generally refer to any stacked vias in uncongested areas. Given one stacked via and the grid-based congestion map, each shape (rectangular or rectilinear) at the intermediate layer of this stacked via can be partitioned into the grids with which it overlaps. For each grid, the number of tracks occupied by the portion of the stacked via (a sub-shape) inside this grid can be calculated considering the direction of this layer (wherein each layer has a predetermined orientation for the tracks on which design elements can be placed). If that grid has a certain overflow, then the congestion cost of the sub-shape can be calculated as either the number of tracks used by the sub-shape or the overflow, whichever is less. The congestion cost of the stacked via is the sum of the costs of the sub-shapes that comprise the stacked via. If the sum is less than a predetermined threshold, then that stacked via can be identified as an uncongested stacked via. In one embodiment, the predetermined threshold can be 0.

Any stacked vias that are not connectivity-necessary stacked vias or uncongested stacked vias (note that the sets of connectivity-necessary stacked vias and uncongested stacked vias may or may not be overlapping) are referenced herein as feasible stacked vias. In accordance with one aspect of the method, any feasible stacked vias of the power network can be virtually removed.

In one embodiment, the total congestion weight of all stacked vias as well as the sum of the congestion weights of the feasible stacked vias can be calculated. Comparing this sum to the total congestion weight can advantageously indicate whether the congestion is due to power network stacked vias and whether stacked via removal for congestion reduction is worthwhile, i.e. the best result that can be achieved without considering the impact on power network voltage drop while maintaining the power network connectivity.

Then, a determination can be made as to whether the target voltage drop is exceeded in the power network. When the target voltage drop is exceeded, a measurement of the severity of at least a maximum voltage drop on the IC can be updated. The node having the maximum voltage drop can be designated a worst-case hot spot. In one embodiment, the nodes in the power network with voltage drops larger than the target voltage drop can be designated as voltage drop hot spots. The sensitivity of each removed feasible stacked via with respect to these voltage drop hot spots can be analyzed, i.e. with respect to the improvement on these voltage drop hot spots if that removed stacked via were virtually returned to the power network. Leveraging a known, merged adjoint network analysis method, the voltage drop sensitivity of each stacked via with respect to a determined set of voltage drop hot spots can be analyzed efficiently with only one power network voltage drop simulation.

After this updating, a set of voltage drop improvement stacked vias (i.e. feasible stacked vias that demonstrate at least a predetermined improvement on the severity of the voltage drop hot spots) can be virtually returned to the power network. The steps of determining whether the target voltage drop is exceeded, updating the severity of the voltage drop at one or more hot spots, and virtually returning the set of voltage drop improvement stacked vias can be repeated until the target voltage drop is not exceeded.

At this point, any remaining feasible stacked vias of the power network (i.e. other than the connectivity-necessary stacked vias, the uncongested stacked vias, and the voltage drop improvement stacked vias can be physically removed. The power network with reduced stacked vias can then be output. Additional steps performed after physical removal of the designated stacked vias can include, for example, performing global routing for congestion verification and performing power network analysis to verify power network connectivity and voltage drop.

In one embodiment, the step of virtually returning the set of voltage drop improvement stacked vias can include sorting the feasible stacked vias based on voltage sensitivity and congestion cost. Sorting of the feasible stacked vias can include determining a ratio of the voltage sensitivity divided by a congestion cost. In one embodiment, this sorting can also include dividing sorted feasible stacked vias into groups and adding back only one group, i.e. the group having the highest ratio, before returning to the step of determining whether the target voltage is exceeded. In one embodiment, each group has a combined congestion cost that is substantially the same. In this manner, the potential improvement on voltage drop hot spots is maximized while the impact to congestion is minimized, thereby accelerating convergence as well as achieving the best quality of results.

DETAILED DESCRIPTION OF THE FIGURES

Conventional approaches to reducing congestion on an IC can undesirably incur higher cost, longer turn-around time, loss of power network connectivity, and/or higher voltage drop. An automatic technique for reducing congestion on the IC, while advantageously ensuring that the power network connectivity is maintained and a target voltage drop is not exceeded, is described below.

Figure 1:
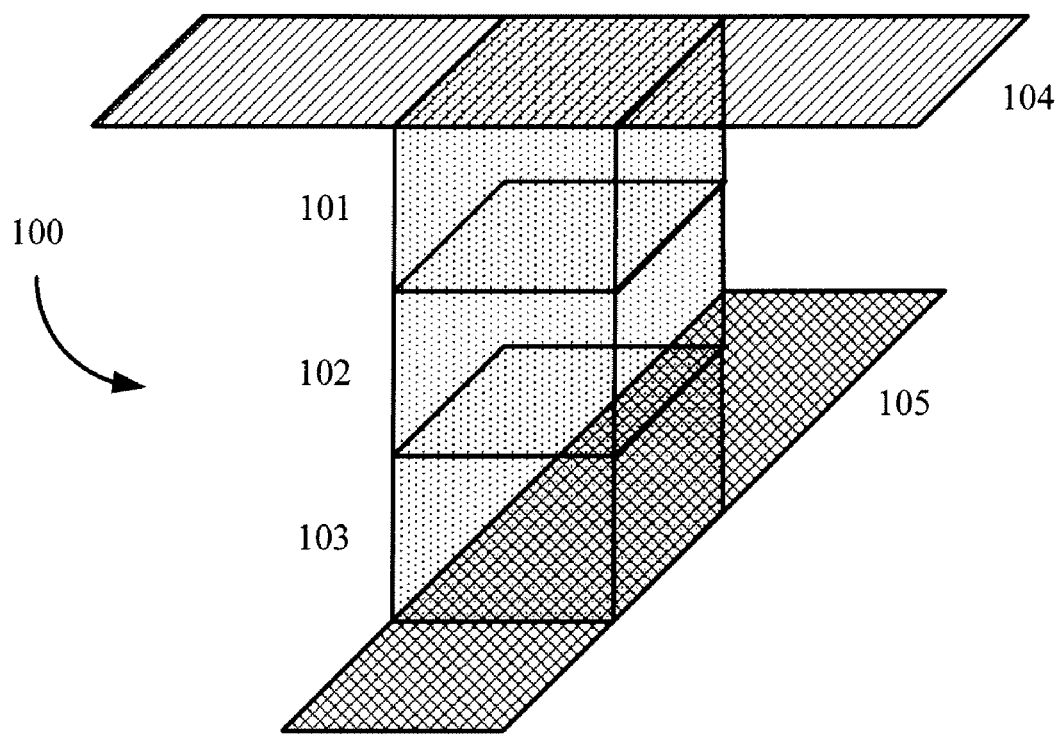
FIG. 1 illustrates an exemplary stacked via.
Figure 2:
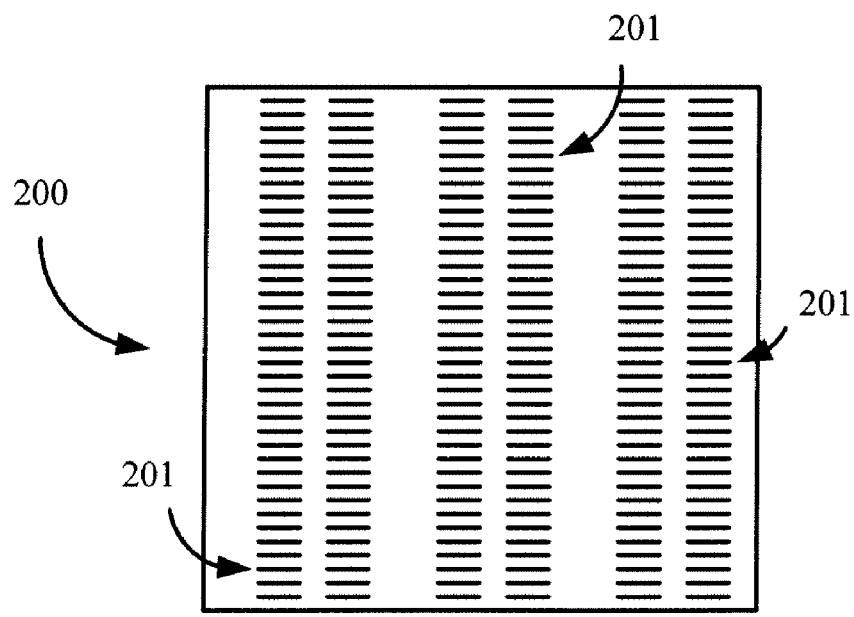
FIG. 2 illustrates an exemplary top view of one layer of a power network including a plurality of vias.
Figure 3:
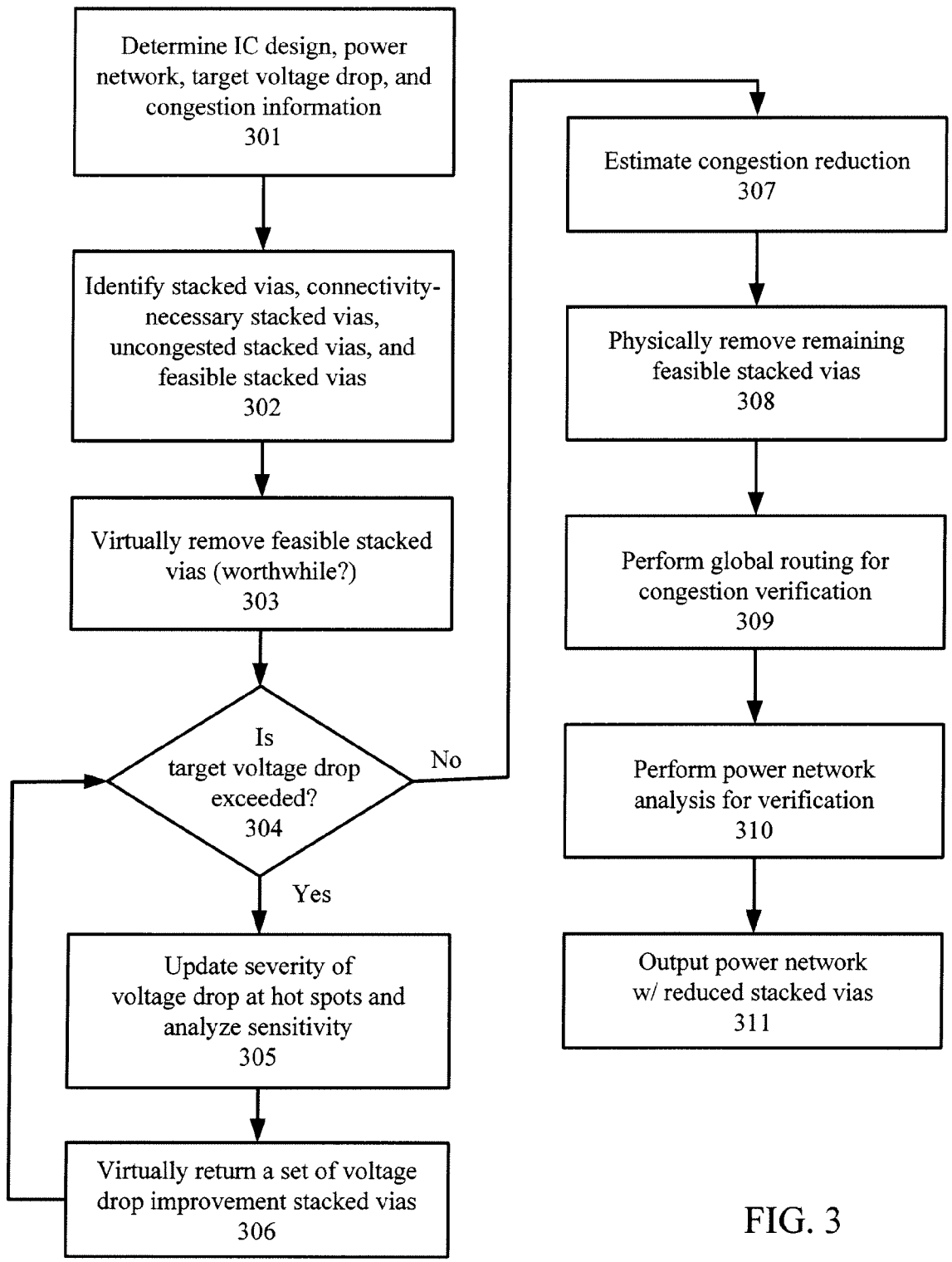
FIG. 3 illustrates an exemplary power network stacked via reduction technique.

FIG. 3 illustrates an exemplary power network stacked via reduction technique 300. In step 301, the IC design, the initial power network, the congestion information based on the IC design and the initial power network, and the target voltage drop can be determined. Note that the congestion information for a stacked via refers to the total congestion associated with the resource occupied by this stacked via at intermediate IC layers. For example, referring back to FIG. 1 for illustration, the congestion information of stacked via 100 can refer to the IC layers formed at the interface of vias 101 and 102 and the interface of vias 102 and 103. Note that even if the stacked via is removed, lines 104 and 105 remain; therefore, the congestion costs associated with the top rectangle of via 101 and the bottom rectangle of via 103 can be ignored. In one embodiment, the target voltage drop (i.e. a threshold voltage drop that differentiates between an acceptable voltage drop on the IC and an unacceptable voltage drop on the IC) can be provided by a user. For example, the user can perform a power network analysis described in U.S. Pat. No. 7,346,869, entitled "Power Network Analyzer For An Integrated Circuit", which is incorporated by reference herein. This power network analysis, which can be performed by a compiler tool (described in reference to FIG. 7), can output the target voltage drop. In another embodiment, the target voltage drop can be provided as a system input (e.g. using the target voltage drop of another power network of the user).

Congestion can be determined by finding a number of tracks (each track indicating a predetermined area suitable for placing a single IC element) occupied in a particular orientation (i.e. either horizontal or vertical) for each grid in a congestion map (which is well known to those skilled in the art of IC design). The number of tracks allowed to be occupied in a grid (in each orientation) depends on the technology node as well as the lithography technology available. If the number of tracks of a grid occupied by the elements of the design and the stacked vias exceed a predetermined threshold, then that grid can be characterized as being congested. For example, if the number of tracks of the grid are 8 and there are design elements currently placed in that grid that take up 11 tracks, then that grid is congested and has an overflow of 3 (i.e. 11−8=3). The minimum overflow is 0 if supply is larger than demand for certain grid. Thus, a larger overflow corresponds to greater congestion of a grid.

Figure 4:
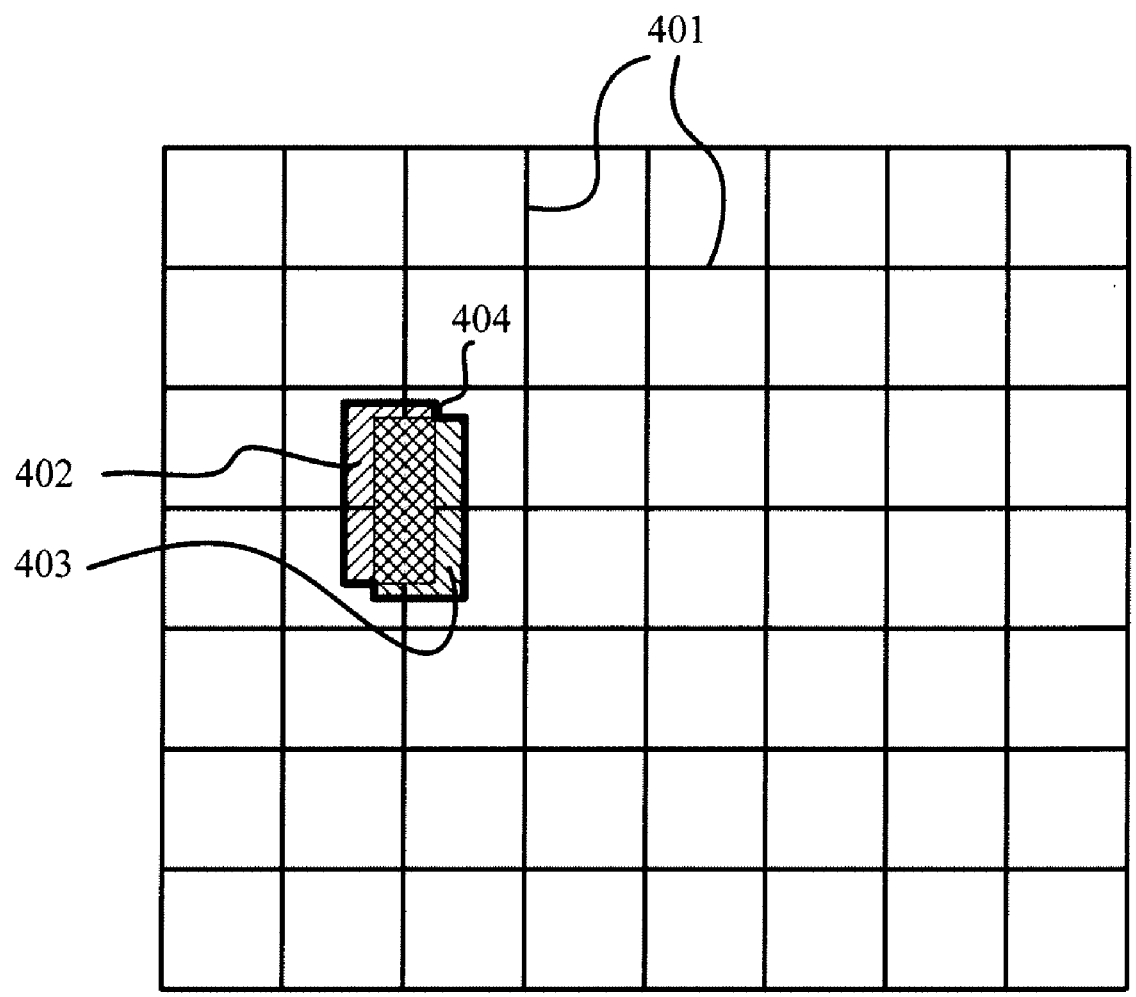
FIG. 4 illustrates an exemplary congestion map having a grid pattern.

Note that because a stacked via may be rectilinear when individual vias are not stacked perfectly, the combined perimeter of two vias can be considered when determining congestion. For example, FIG. 4 illustrates an exemplary congestion map 400 having a grid pattern 401. As shown in FIG. 4, two vias 402 and 403, which form a stacked via, have a combined rectilinear, not a rectangular, perimeter 404. This rectilinear perimeter 404 can advantageously be used to provide an accurate determination of congestion for each grid overlapped by perimeter 404. Note that other stacked vias and components of the IC design are not shown in FIG. 4 for simplicity.

Referring back to FIG. 3, step 302 can identify the connectivity-necessary stacked vias, the uncongested stacked vias, and the feasible stacked vias. Connectivity-necessary stacked vias refer to any stacked vias necessary to implement the IC design. In one embodiment, identifying the connectivity-necessary stacked vias can include modeling the power network as a graph, wherein an edge in the graph can represent a wire segment, a via, or a stacked via. A node in the graph represents the intersection between two or multiple edges. A source node in the graph represents a power pad or pin which provides power. A super source node in the graph is a node connecting all the source nodes. A sink node in the graph represents a current sink, e.g. the power pin of one standard cell or macro block which consumes power. The congestion cost of each wire segment, via, or stacked via can be determined by analyzing the total congestion overflow associated with itself based on a congestion map (which includes both the power network and components of the IC design). Each edge is then associated with a congestion weight based on the corresponding wire, via, or stacked via.

A minimum set of edges can be identified in the graph such that there is at least one path from the super source node to each sink node. Notably, at the same time, the total congestion weights of the minimum set of edges can be minimized. This set of edges is herein referenced as essential edges. The stacked vias corresponding to any edge in the resulting minimum set of edges can be identified as connectivity-necessary stacked vias.

In one embodiment to identify essential edges, a Minimum Spanning Tree (MST) can be extracted from the graph to connect all nodes in the graph. The paths only composed of MST edges are then traced back from each sink node back to the super source node. The edges in these paths can be identified as essential edges. In another embodiment to identify essential edges, the shortest path from the super source node to each sink node can be found, wherein the distance of each edge is the congestion weight. In yet another embodiment to identify essential edges, the multiple-sink graph-based Minimum Steiner Tree routing from the super source node to each sink node can be explored.

Uncongested stacked vias generally refer to any stacked vias in uncongested areas. Given one stacked via and the grid-based congestion map, each shape (rectangular or rectilinear) at the intermediate layer of this stacked via can be partitioned into the grids with which it overlaps. For each grid, the number of tracks occupied by the portion of the stacked via (a sub-shape) inside this grid can be calculated considering the direction of this layer (wherein each layer has a predetermined orientation for the tracks on which design elements can be placed). If that grid has a certain overflow, then the congestion cost of the sub-shape can be calculated as either the number of tracks used by the sub-shape or the overflow, whichever is less. The congestion cost of the stacked via is the sum of the costs of the sub-shapes that comprise the stacked via. If the sum is less than a predetermined threshold, then that stacked via can be characterized as an uncongested stacked via. In one embodiment, the predetermined threshold can be 0.

Any stacked vias that are not connectivity-necessary stacked vias or uncongested stacked vias (note that the sets of connectivity-necessary stacked vias and uncongested stacked vias may or may not be overlapping) can be identified as feasible stacked vias. Step 303 can virtually remove the feasible stacked vias from the power network.

Figure 5A:
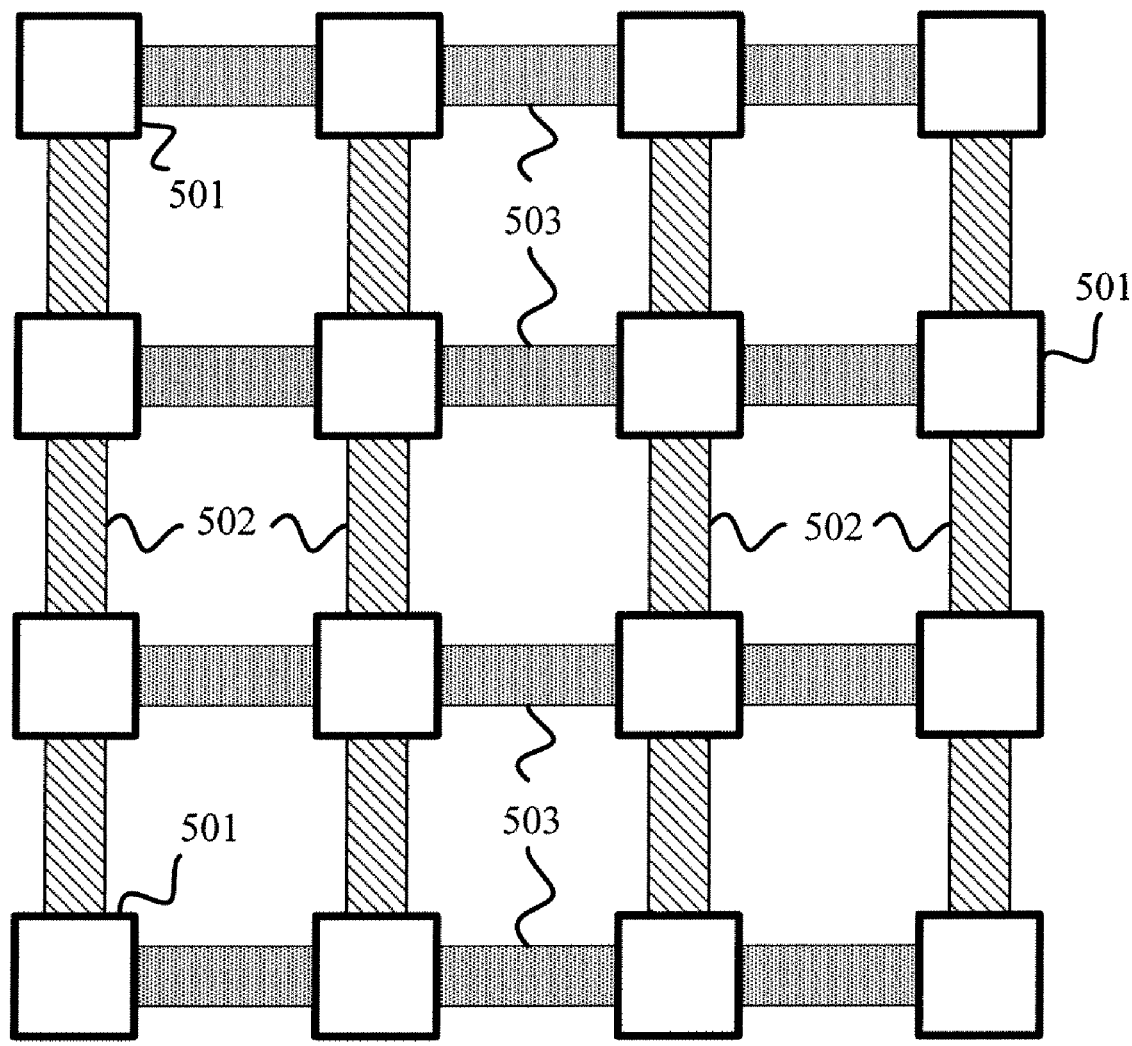
FIG. 5A illustrates an exemplary power network including stacked vias that connect metal lines in a first metal layer to metal lines in a second metal layer.
Figure 5B:
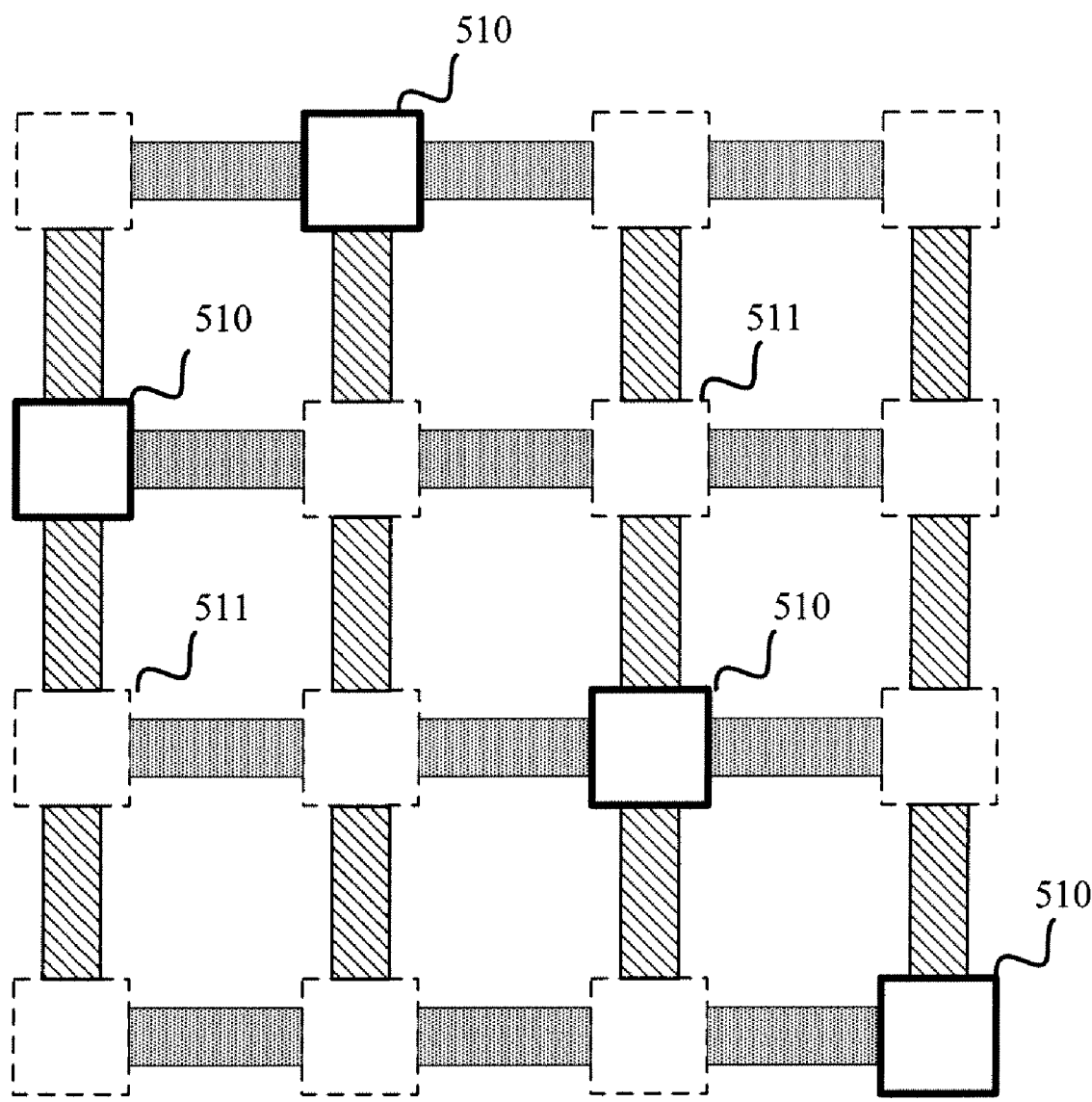
FIG. 5B illustrates the power network after the feasible stacked vias are virtually removed, thereby leaving connectivity-necessary stacked vias.

For example, FIG. 5A illustrates an exemplary power network 500 including stacked vias 501 that connect metal lines 502 (in a first metal layer) and metal lines 503 (in a second metal layer). FIG. 5B illustrates power network 500 after the feasible stacked vias 511 are virtually removed (shown with a dashed-line perimeter), thereby leaving connectivity-necessary and uncongested stacked vias 510 (shown with a solid, bold line perimeter).

In one embodiment, the total congestion weight of all stacked vias as well as the sum of the congestion weights of the feasible stacked vias can be calculated. Comparing this sum to the total congestion weight can advantageously indicate whether the congestion is due to power network stacked vias and whether stacked via removal for congestion reduction is worthwhile, i.e. the best result that can be achieved without considering the impact on power network voltage drop while maintaining the power network connectivity.

For example, the total congestion (measured in overflow) in an IC design with power network is 1000. The total congestion due to power network stacked vias is 600, or 60%. The total congestion due to all feasible stacked vias is 500, or 50%. In other words, it is worthwhile to perform power network stacked via reduction since a conservative upper bound of 50% congestion reduction can be achieved by applying this reduction technique.

In another example, the total congestion (measured in overflow) in an IC design with power network is 1000. The total congestion due to power network stacked vias is 50, or 5%. The total congestion due to all feasible stacked vias is 10, or 1%. In other words, it is not worthwhile to perform power network stacked via reduction since congestion is not due to power stacked vias and the conservative upper bound of congestion reduction that can be achieved by applying this reduction technique is only 1%.

At this point, step 304 can determine whether the target voltage drop for the power network has been exceeded. For example, although reducing the number of stacked vias to the bare minimum necessary for connectivity can advantageously minimize congestion in congested areas, this number may be insufficient to ensure satisfactory power distribution across the power network.

When the target voltage drop is exceeded, a measurement of the severity of at least a maximum voltage drop on the IC can be updated in step 305. The node having the maximum voltage drop can be designated a worst-case hot spot. In one embodiment, the nodes in the power network with voltage drops larger than the target voltage drop can be designated as voltage drop hot spots and their voltage drop severity updated.

The voltage sensitivity of each removed feasible stacked via with respect to these voltage drop hot spots can also be analyzed in step 305. In one embodiment, the voltage sensitivity can measure an impact that a particular feasible stacked via has on identified voltage drop hot spots if that feasible stacked via were virtually returned to the power network. To most effectively minimize voltage drop in the power network, feasible stacked vias having higher voltage sensitivity can be virtually returned before feasible stacked vias having lower voltage sensitivity. Note that the set of voltage drop hot spots can include one or more voltage drop locations (which can change based on the target voltage drop). In one embodiment, the voltage sensitivity analysis can be performed with comparison to at least one voltage drop spot, e.g. the worst voltage drop spot. Using a known, merged adjoint network analysis method, the voltage drop sensitivity of each stacked via with respect to a determined set of voltage drop hot spots can be analyzed efficiently with only one power network voltage drop simulation.

After this updating, a set of feasible stacked vias that demonstrate at least a predetermined improvement on the severity of the voltage drop hot spots, called voltage drop improvement stacked vias herein, can be virtually returned to the power network in step 306. In one embodiment, described in further detail in reference to FIG. 6, an algorithm comprising congestion cost and voltage sensitivity can be used to determine the set of additional stacked vias in step 306. As mentioned above, the congestion cost relates to the overflow of occupied tracks in a grid, e.g. the greater the overflow, the higher the congestion cost.

Figure 5C:
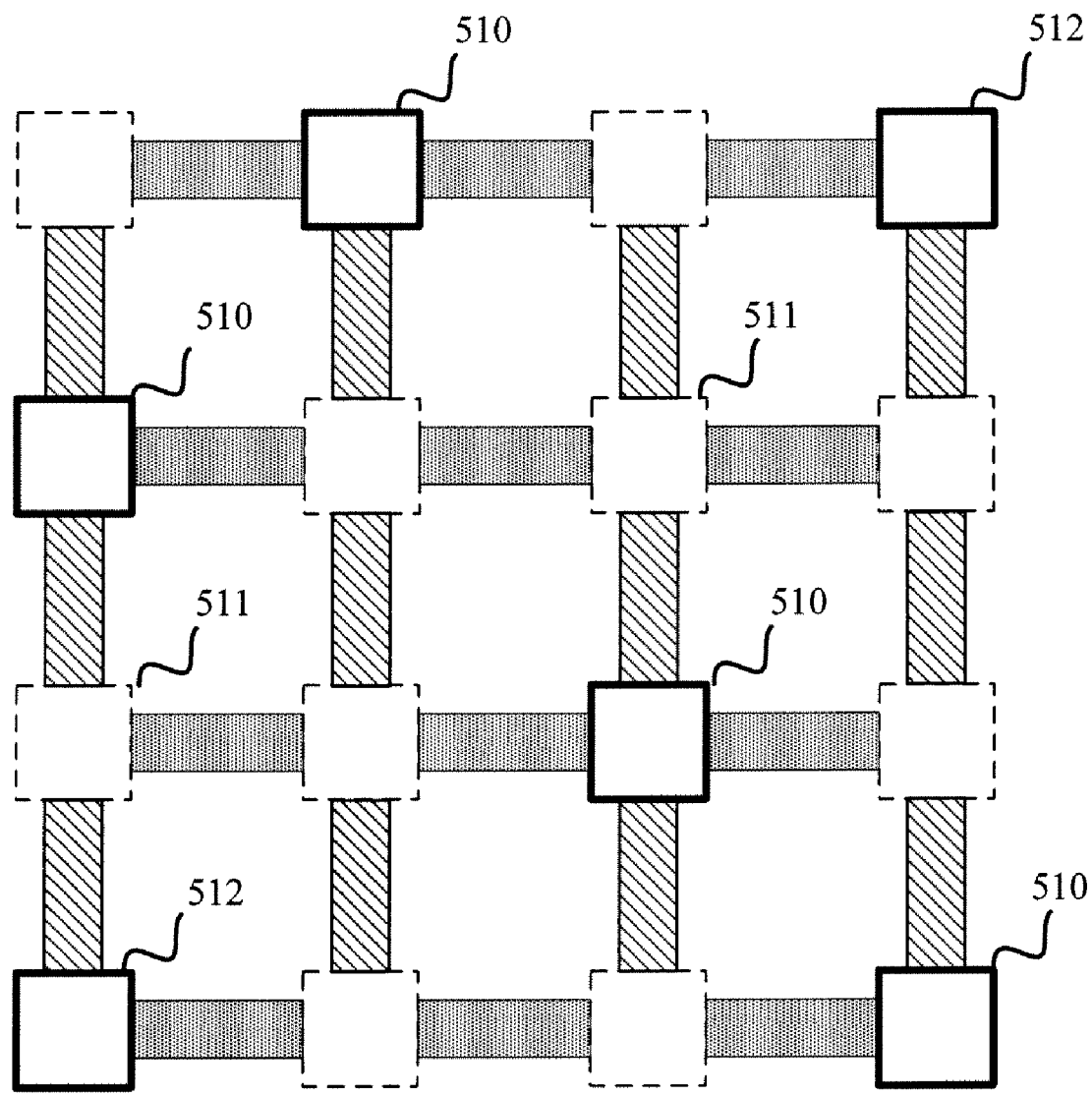
FIG. 5C illustrates the power network after voltage-drop improvement stacked vias are added to connectivity-necessary stacked vias.

The new set of voltage-drop improvement stacked vias, connectivity-necessary stacked vias, and uncongested stacked vias along with other power network elements, e.g. wire segments, that form the current power network can be used in step 304 to recalculate the maximum voltage drop on the IC and determine whether that maximum voltage drop exceeds the target voltage drop. Steps 304-306 can be repeated as necessary until the target voltage drop is not exceeded, i.e. no voltage drop hot spots are detected. FIG. 5C illustrates power network 500 after voltage-drop improvement stacked vias 512 are added to connectivity-necessary and uncongested stacked vias 511. Note that because the voltage-drop improvement stacked vias improve the voltage drop of the IC, the severity of the voltage drop hot spots is reduced in step 306 and then can be updated in step 305. Notably, no new voltage drop hot spots are created in these steps. Indeed, as steps 304, 305, and 306 are repeated, the locations of the voltage drop hot spots on the IC are eliminated.

When the target voltage drop is not exceeded, as determined in step 304 (i.e. no voltage drop hot spots are present), then step 307 can estimate the congestion reduction. In one embodiment, the congestion reduction can be estimated as the sum of congestion costs of all reduced stacked vias. This estimation is based on the existing routing and tends to be conservative because the released tracks in one grid may be used by the demanding of neighbor grid through detours upon a new routing. Step 308 can physically remove the stacked vias other than the connectivity-necessary stacked vias, the uncongested stacked vias, and the voltage drop improvement stacked vias.

At this point, global routing can then be performed in step 309 for IC congestion verification. Note that global routing is based on the specific IC design and available resources. With various feasible stacked vias removed, thereby resulting in more available resources, global routing may be performed again to verify congestion. Power network analysis can be performed in step 310 to verify the voltage drop and connectivity of the newly optimized power network. Step 311 can output the newly optimized power network with reduced stacked vias.

Figure 6:
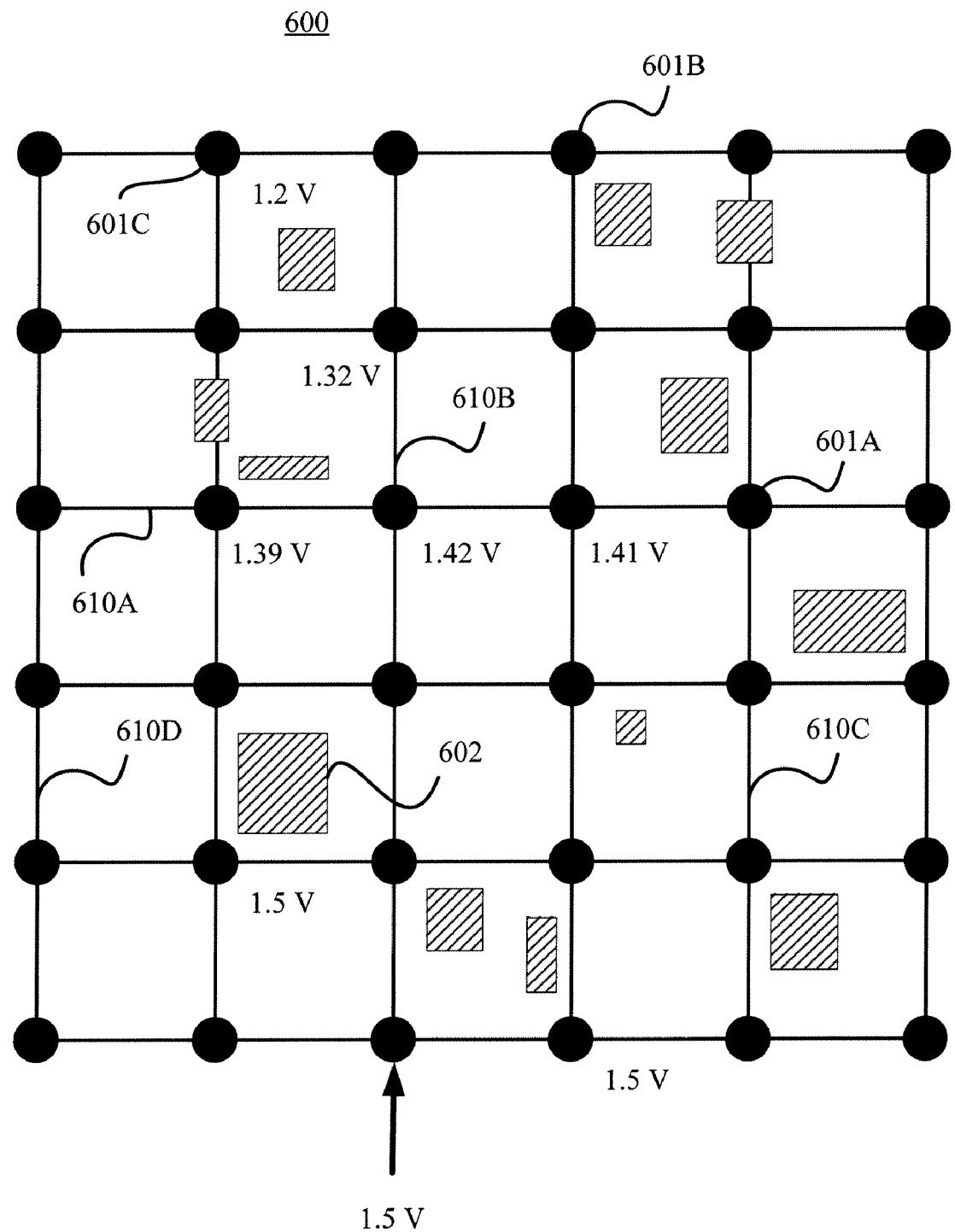
FIG. 6 illustrates an exemplary voltage drop map of an IC having a plurality of nodes.

To determine the voltage sensitivity, a voltage drop map can be generated. FIG. 6 illustrates an exemplary voltage drop map 600 of an IC having a plurality of nodes 601 (only 601A, 601B, 601C labeled for simplicity). In one embodiment, each edge 610 (only 610A, 610B, 610C, 610D labeled for simplicity) corresponds to a stacked via of the power network. Note that edges 610 typically represent power network elements, e.g. wire segments, vias, and stacked vias. Therefore, each edge 610 can be characterized as one resistor. In contrast, each node 601 can be used to represent the intersection or connection point between two or multiple edges. In voltage drop map 600, a power source (in this case, 1.5 V) is introduced to one or more nodes 601 (only one shown in FIG. 6 for simplicity). Each node 601 of voltage drop map 600 has an associated voltage that depends on the elements 602 (one element labeled for simplicity) of the design and their placement and power consumption, and the equivalent resistance associated with the path from the power source to that particular node. Elements 602 are modeled as current sinks in the power network.

Unfortunately, eliminating one stacked via may affect the voltage of other nodes in the power network. For example, eliminating the stacked via associated with edge 610A could affect the voltage of any node, e.g. node 601A. In accordance with one feature of the power network stacked via reduction technique, each edge 610 is evaluated for its impact on the voltage drop hot spots. For example, assume that node 601C is the only identified voltage drop hot spot with a voltage of 1.2 V (with a target voltage drop of 1.35 V). Then, edge 610A can be evaluated for its impact on the voltage of node 601C if the stacked via associated with edge 610A is returned to the power grid. In one embodiment, the more the voltage drop improves at the voltage drop hot spot, the greater the voltage sensitivity of the stacked via (and its corresponding node) being evaluated. As described above, the voltage sensitivities of the stacked vias can be used to determine which stacked vias to be returned to the power network in step 306 (FIG. 3).

In one embodiment, an algorithm comprising the voltage sensitivity divided by the congestion cost (i.e. voltage sensitivity/congestion cost) can be used to determine which of feasible stacked vias 511 (FIG. 5B) should be returned to the power network. As indicated above, the congestion cost can be determined in various ways, e.g. the overflow. Note that feasible stacked vias are only inside congested areas of the IC and, as a result, the congestion cost is ensured to be positive (and a "0" in the denominator is avoided).

In one embodiment, all feasible stacked vias that have been removed can be sorted based on the voltage sensitivity/congestion cost ratio, e.g. from high to low. Feasible stacked vias having higher ratios can be selected before feasible stacked vias having lower ratios. By using this ratio and selection process, feasible stacked vias having less congestion will generally be selected for return before feasible stacked vias having more congestion. Similarly, feasible stacked vias, having greater voltage sensitivity will generally be selected for return to the power network before feasible stacked vias having lesser voltage sensitivity. Thus, the above-described voltage sensitivity/congestion cost ratio, the sorting of these ratios, and the selection of voltage drop improvement stacked vias based on this sorting can advantageously minimize congestion as well as maximize the improvement to the worst case voltage location on the IC.

In one embodiment, to further optimize the selection process, groups of sorted stacked vias can be formed based on the number of desired iterations for voltage drop improvement stacked vias to be added to the power network. For example, assume that 100 feasible stacked vias have been sorted based on the voltage sensitivity/congestion cost ratio and that a maximum of 5 iterations are desired. Therefore, 5 groups of sorted stacked vias can be formed. In one embodiment, the combined overflow of the stacked vias within each of these five groups is substantially equal. In this case, it is probable that the number of stacked vias in each of the groups varies. For example, there could be 40 stacked vias in the first group (having the highest ratios), 20 stacked vias in the second group (having the next highest ratios), 15 stacked vias in the third group, 20 stacked vias in the fourth group, and 5 stacked vias in the fifth group (having the lowest ratios). In this manner, the impact to the voltage drop is maximized while the impact to congestion is minimized, thereby accelerating convergence.

Figure 7:
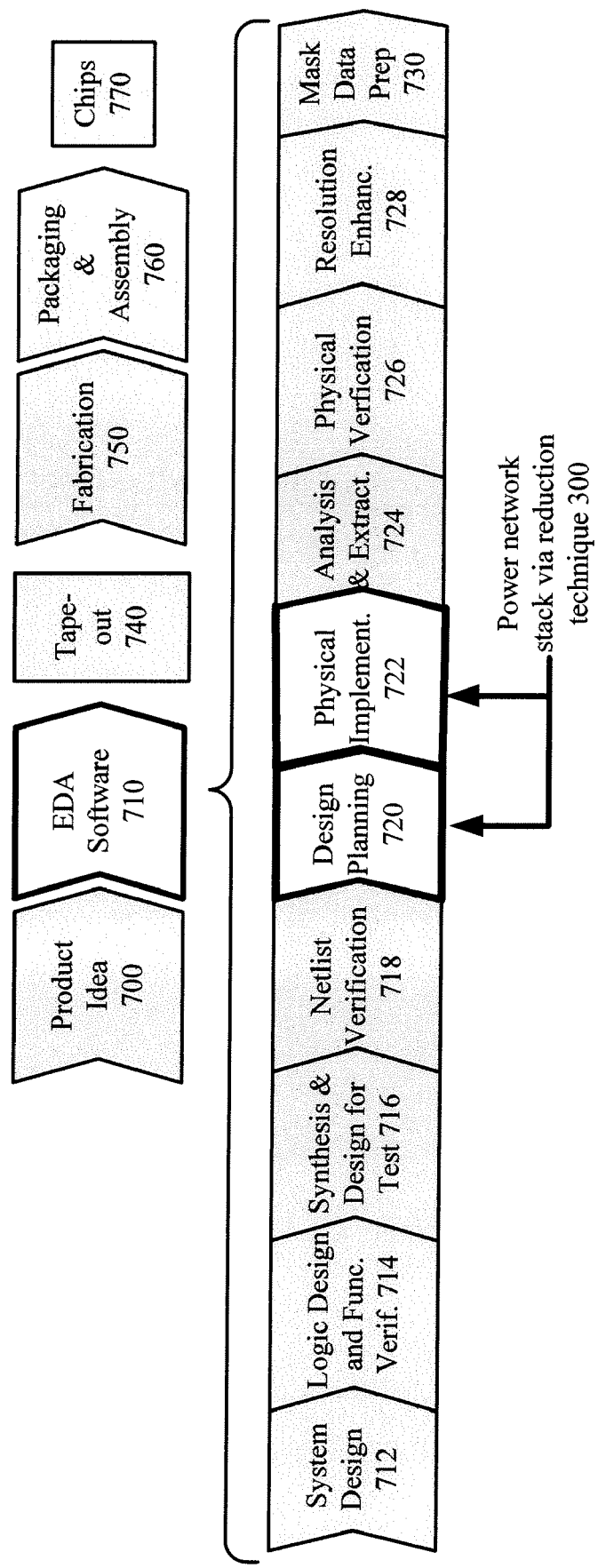
FIG. 7 shows a simplified representation of an exemplary digital ASIC design flow including the power network stacked via reduction technique.

FIG. 7 shows a simplified representation of an exemplary digital ASIC design flow including the power network stacked via reduction technique. At a high level, the process starts with the product idea (step 700) and is realized in an EDA software design process (step 710). When the design is finalized, it can be taped-out (event 740). After tape out, the fabrication process (step 750) and packaging and assembly processes (step 760) occur resulting, ultimately, in finished chips (result 770).

The EDA software design process (step 710) is actually composed of a number of steps 712-730, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 710) will now be provided:

System design (step 712): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 714): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS, VERA, DesignWare®, Magellan, Formality, ESP and LEDA products.

Synthesis and design for test (step 716): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, Tetramax, and DesignWare® products.

Netlist verification (step 718): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 720): Here, an overall floorplan for the chip is constructed and analyzed for timing and top-level routing. Exemplary EDA software products from Synopsys, Inc. that can be used at this step include Astro and IC Compiler products. In one embodiment, the power network stacked via reduction technique 300 described in reference to FIG. 3 can be implemented in an IC compiler tool during design planning.

Physical implementation (step 722): The placement (positioning of circuit elements) and routing (connection of the same) occurs at this step. Exemplary EDA software products from Synopsys, Inc. that can be used at this step include the Astro and IC Compiler products. In one embodiment, the power network stacked via reduction technique 300 can also be implemented in an IC compiler tool during physical implementation.

Analysis and extraction (step 724): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 726): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 728): This step involves geometric manipulations of the layout to improve manufacturability of the design. Exemplary EDA software products from Synopsys, Inc. that can be used at this step include Proteus, ProteusAF, and PSMGen products.

Mask data preparation (step 730): This step provides the "tape-out" data for production of masks for lithographic use to produce finished chips. Exemplary EDA software products from Synopsys, Inc. that can be used at this step include the CATS(R) family of products.

The invention can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, although a power network in a grid pattern is discussed, other ID design embodiments may include one-terminal floating wires in such a grid pattern. These one-terminal floating wires may be included for connecting a macro whose location is not yet decided. In this case, the stacked via connected to that macro can be designated a connectivity-necessary stacked via. In one embodiment, before physically removing the designated stacked vias (step 308, FIG. 3), an electro-migration (EM) map of the IC can be previewed by the user. At this point, the user may decide to manually include yet further stacked vias to ensure EM compliance.

In one embodiment, wire capacitance and pad inductance along with the wire (or via) resistance can be further extracted from the power network for more accurate time-varying power network voltage drop analysis when performing stacked via reduction. In another embodiment, stacked vias may not be removed but selectively replaced with smaller stacked vias (e.g. vias with small number of cuts inside) which have larger resistance, but occupy less amount of resources. In yet another embodiment, stacked via density constraint (i.e. the minimum number of stacked vias in a unit chip area) can be further considered when removing stacked vias. In yet another embodiment, other power network element, e.g. wires, may be further resized or removed to reduce congestion while maintaining power network connectivity and minimizing voltage drop.

Accordingly, it is intended that the scope of the invention be defined by the following Claims and their equivalents.

The invention claimed is:

1. A method of automatically reducing stacked vias in a power network of an integrated circuit (IC), the method comprising:

determining an IC design, a power network of the IC design, a target voltage drop of the power network, and congestion information based on the IC design and the power network;

identifying any connectivity-necessary stacked vias and uncongested stacked vias of the power network based on the congestion information, the connectivity-necessary stacked vias being stacked vias necessary for power connectivity, and the uncongested stacked vias being stacked vias in uncongested areas of the IC;

virtually removing any feasible stacked vias of the power network, wherein feasible stacked vias are other than connectivity-necessary stacked vias and uncongested stacked vias;

determining whether the target voltage drop is exceeded in the power network;

when the target voltage drop is exceeded, updating a measurement of a severity of at least a maximum voltage drop on the IC;

after updating, virtually returning a set of voltage drop improvement stacked vias to the power network, the set of voltage drop improvement stacked vias being a subset of the feasible stacked vias;

using a computer, repeating determining, updating, and virtually returning until the target voltage drop is not exceeded;

physically removing any stacked vias of the power network other than connectivity-necessary stacked vias, uncongested stacked vias, and voltage drop improvement stacked vias; and outputting the power network with reduced stacked vias.

2. The method of claim 1, further including performing global routing for congestion verification after physically removing.

3. The method of claim 1, further including performing power network analysis for voltage drop and connectivity verification after physically removing.

4. The method of claim 1, wherein virtually returning includes:

sorting the feasible stacked vias based on a voltage sensitivity and a congestion cost.

5. The method of claim 4, wherein sorting includes determining a ratio of the voltage sensitivity divided by a congestion cost.

6. The method of claim 5, wherein the voltage sensitivity of each feasible stacked via is determined by analyzing an impact on at least one voltage drop hot spot of the power network by returning that feasible stacked via to the power network.

7. The method of claim 6, wherein the congestion cost of each feasible stacked via is determined by analyzing an overflow associated with that feasible stacked via.

8. The method of claim 7, further including dividing sorted feasible stacked vias into groups and adding back only one group before returning to determining whether the target voltage is exceeded.

9. The method of claim 7, wherein the one group is a remaining group with a highest ratio.

10. The method of claim 9, wherein each group has a combined congestion cost that is substantially the same.

11. The method of claim 1, further including:

determining if a congestion problem of the IC design is due to stacked vias.

12. The method of claim 1, further including:

calculating a total congestion weight of all stacked vias;

calculating a sum of congestion weights of the feasible stacked vias;

comparing the sum to the total congestion weight;

determining whether congestion on the IC is due to stacked vias and whether stacked via removal is worthwhile.

* * * * *

UNITED STATES PATENT AND TRADEMARK OFFICE
CERTIFICATE OF CORRECTION

| | | |
|---|---|---|
| PATENT NO. | : 7,984,397 B2 | Page 1 of 1 |
| APPLICATION NO. | : 12/359091 | |
| DATED | : July 19, 2011 | |
| INVENTOR(S) | : Yan Lin et al. | |

It is certified that error appears in the above-identified patent and that said Letters Patent is hereby corrected as shown below:

<u>Column 12</u>
Line 42, insert --drop-- after "voltage".

Signed and Sealed this
Eleventh Day of September, 2012

David J. Kappos
*Director of the United States Patent and Trademark Office*